United States Patent [19]
Tou

[11] Patent Number: 6,002,997
[45] Date of Patent: Dec. 14, 1999

[54] METHOD FOR TRANSLATING CULTURAL SUBTLETIES IN MACHINE TRANSLATION

[76] Inventor: Julius T. Tou, 2045 NW. 14th Ave., Gainesville, Fla. 32605

[21] Appl. No.: 08/667,701

[22] Filed: Jun. 21, 1996

[51] Int. Cl.⁶ ..................................................... G06F 17/28
[52] U.S. Cl. ....................................................... 704/2; 704/4
[58] Field of Search ............................ 704/1–4, 10, 277; 434/157

[56] References Cited

U.S. PATENT DOCUMENTS

| | | | |
|---|---|---|---|
| 4,502,128 | 2/1985 | Okajima et al. | 704/2 |
| 4,654,798 | 3/1987 | Taki et al. | 704/2 |
| 5,220,503 | 6/1993 | Suzuki et al. | 704/2 |
| 5,224,040 | 6/1993 | Tou | 704/2 |
| 5,275,569 | 1/1994 | Watkins | 434/157 |
| 5,384,702 | 1/1995 | Tou | 704/8 |
| 5,418,716 | 5/1995 | Sumatsu | 704/2 |
| 5,442,547 | 8/1995 | Kutsumi et al. | 704/2 |
| 5,486,111 | 1/1996 | Watkins | 434/157 |
| 5,640,575 | 6/1997 | Maruyama et al. | 704/2 |

Primary Examiner—Joseph Thomas
Assistant Examiner—Patrick N. Edouard
Attorney, Agent, or Firm—Ronald E. Smith

[57] ABSTRACT

A method for translating sentences in a source language to sentences in a target language. A knowledge base includes a plurality of information patterns in the source language which represents substantially all possible information patterns of the source language. A corresponding plurality of information patterns in the target language are contained in the same knowledge base, and are associated with source language information patterns in accordance with a predetermined determination. To translate a source language sentence into a target language sentence, the source language sentence is analyzed and its constituent parts of speech are determined so that a specific information pattern is identified. The knowledge base is consulted, and the corresponding target language information pattern is identified. The source language words are then inserted into the target language information pattern to form a Linguistic Canonical Form which is translated. Self-correcting grammar rules are then applied to provide a polished translation.

2 Claims, 2 Drawing Sheets

METHOD FOR TRANSLATING CULTURAL SUBTLETIES IN MACHINE TRANSLATION

BACKGROUND OF THE INVENTION

1. Field of the Invention

This invention relates, generally, to computer translation of a source language into a target language. More particularly, it relates to a machine translation that takes cultural subtleties into consideration when making a translation.

2. Description of the Prior Art

U.S. Pat. No. 5,224,040 to the present inventor (sometimes hereinafter referred to as "the first patent"), discloses a machine for translating a source language, such as Chinese, into a target language, such as English. Since Chinese sentences are written in strings of characters, and since the characters combine in different ways to produce different words, the method disclosed in that earlier patent includes the steps of inputting a Chinese character string, segmenting that string to identify character groups that form words and idioms, and producing a raw translation of those words into the target language.

In the second generation of the machine, disclosed in U.S. Pat. No. 5,384,702 to the present inventor (sometimes hereinafter referred to as "the second patent"), grammar rules and self-correction rules are applied to the raw translation to polish it.

However, the syntactic structure and sentence composition of a source language reflects the cultural influences that worked on the source language during the many centuries of its development. The same observation applies to a target language as well. Thus, there is usually a considerable gap between the syntactic structure and sentence composition between any two source and target languages. The machines and methods disclosed in the first and second patents included no means whereby such differences were taken into account. As a result, even after the raw sentence produced in the machine disclosed in the first patent was polished in the machine disclosed in the second patent by the identification of grammar markers therewithin and the application of grammar rules and self-correction rules thereto, it was still possible to obtain a polished sentence that lacked the syntactic structure and sentence composition of the target language, i.e., the grammar rules and self-correction rules alone were not sufficient to bridge the gap between the respective syntactic structures and sentence compositions of languages lacking a common cultural background.

What is needed, then, is a third generation of machines that takes the differing syntactic structures and sentence compositions of source and target languages into consideration when improving a raw translation so that the polished translation substitutes the syntactic structures and sentence compositions of the target language for the syntactic structures and sentence compositions of the source language.

No prior art translation computer has the capability of converting a sentence in a source language having the syntax and sentence structure of the source language into a target language sentence having the syntax and structure of the target language. The conventional wisdom has always been that such a feat would be possible only if all possible sentences in the source language were matched in a computer memory with a predetermined counterpart sentence in the target language. In other words, human linguists would be required to match all possible sentences in the respective languages, and the computer would then simply produce the target sentence that matched the source sentence. Obviously, since the number of possible sentences in any language is infinite, such a scheme has long been understood to be impractical.

No general purpose translation machine heretofore known is capable of translating an infinite number of grammatically correct source language sentences into an infinite number of grammatically correct target language sentences where the respective languages include differing syntax's and sentence structures.

Moreover, in view of the prior art when considered as a whole at the time the present invention was made, it was not obvious to those of ordinary skill in this art how such a general purpose translation machine could be provided.

SUMMARY OF THE INVENTION

The long-standing but heretofore unfulfilled need for a method that takes cultural subtleties into consideration in the context of machine translations is now met by a new, useful, and nonobvious invention that pioneers a new generation of translation computers. The present invention includes a method whereby the syntactic structure and sentence composition of a source language is analyzed, interpreted and mapped into the associated syntax and sentence structures of the target language. The result is the first translation machine, anywhere in the world, that produces target language sentences that are grammatically correct in syntax and sentence structure from source language sentences having differing syntax's and sentence structures. Hence, the present invention provides the first translation machine capable of matching human translators who are fluent in the source and target languages. Unlike human translators, however, the machine of the present invention is not limited in the number of languages that it may translate.

The novel method employs Linguistic Canonical Forms (LCFs) and Information Patterns (IPs) to translate cultural subtleties via the mapping of the source-language thought processes into the target-language thought processes.

The novel steps are performed downstream of the raw translation provided in the translation machine disclosed in the first patent, and upstream of the steps performed by the machine disclosed in the second patent. Accordingly, by the time the grammar and self-correction rules disclosed in the second patent are applied, the raw sentence produced in the machine of the first patent will have already been improved by the steps of the present invention to reflect the syntax and sentence structure of the target language. The result is a highly polished sentence in the target language that incorporates the cultural subtleties of the target language and which does not reflect the cultural subtleties of the source language, i.e., a sentence of the quality heretofore obtainable only by human translators.

The LCF of a source language with respect to a target language is an expression using the words of the source language but wherein said source language words are arranged in accordance with target-language thought processes and sentence structure. Thus, the LCF reflects the cultural background of the target language (which may be any natural language). This ensures that the subsequent translation step performed by the invention of the second patent will produce a highly polished sentence as aforesaid.

In the first step of the novel method, where the source language is Chinese, the character string is first grouped into recognizable Chinese words in accordance with the methods taught in the first patent. The result is a raw sentence that contains the syntactic structure and sentence composition of the source language. The present invention than re-arranges those Chinese words into a sentence that is formed along the lines of an English sentence, i.e., a linguistic canonical form (LCF) is generated by arranging the Chinese words in accordance with a predetermined English sentence structure.

As an example, where the source language is Chinese and the target language is English, the first level of translation, performed in the machine disclosed in the first patent, might be: "Zhe ben shu shi ta xie de." Literal translation produces: "This ben book is he write de," where "ben" is a measure word (MW) like "sheet" in the expression "one sheet of paper," and where "de" has no English translation but indicates past tense and passive voice. The information pattern in the source language is Pronoun (P)+MW+Noun (N)+Verb (V)+P+V+de. The predetermined corresponding information pattern in the target language is P+N+be+V+by+P. The LCF is therefore "Zhe shu shi xie bei ta," the raw translation of which is "This book is write by he," and the polished translation of which is "This book was written by him."

Note that "Zhe shu shi xie bei ta" is an expression using Chinese words arranged in an English sentence structure. Thus, the words may now be translated and the resulting sentence will make sense in English, requiring only a polishing by the method disclosed in the second patent.

The English expression "This book is he write" may be thought of as a Chinese-English expression because it reflects Chinese thought processes and sentence structures, i.e., as noted above, it is derived from a translation of Chinese words before said words are arranged into an English sentence structure. For purposes of explanation, this Chinese-English expression will be referred to as LCF1; it is useful in performing automatic translation from English to Chinese because it already has Chinese syntax and sentence structure. This raw translation (which is a word-for-word translation of "Zhe shu shi ta xie") then undergoes some lexical editing in accordance with the method taught in the second patent to make it more readable.

The LCF of "This book was written by him" is: "Zhe shu shi xie bei ta." This is the so-called English-Chinese which is a Chinese expression using English thought processes and sentence structures. This is called linguistic canonical form LCF2. Direct translation of LCF2 yields: "This book is write by he." The LCF2 is useful in performing automatic translation from Chinese to English. This raw translation then undergoes grammatical corrections, in accordance with the methods taught in the second patent, to make it more readable.

Thus it is understood that the main idea behind the novel method is to generate an LCF corresponding to the input source language sentence. From the LCF, the machine performs the translation into the target language sentence.

Since it is impossible to store all possible sentences and impractical to attempt to store millions of sentences in both source and target languages for matching, the present invention includes the breakthrough insight that all sentences can be represented by a finite number of information patterns.

However, there are some similarities between Chinese and English. When the syntactic structure and sentence composition of a Chinese sentence are similar to an English sentence, the translation is straightforward and the generation of an LCF is not necessary. For example, a word-for-word translation of the Chinese sentence "Ta du shu kwai" into English yields "He read book quick" which is refined into "He read the book quickly." In this example, there is no need to re-arrange the Chinese words into an English sentence structure since both languages share the same sentence structure.

On the other hand, there are a great many Chinese sentences with syntax and sentence composition entirely different from those of the English translation. Under such circumstances, the application of the LCF provides an innovative way for the machine to perform correct translation, as indicated above.

As another example, consider the Chinese sentence "Ta ba shu fang zai shu zhuo shang," where "ba" has no English translation; a word-for-word translation yields "He ba book put at desk on." The expression "zai shu zhuo shang" is an adverbial phrase meaning "on the desk." The information pattern (IP) of the sentence in the source language is P+ba+N+V+Adverb (Adv). The corresponding predetermined IP for the target language is P+V+N . By plugging in the Chinese words into the target language IP, we get "Ta fang shu zai shu zhuo shang" and that is the LCF for this sentence, i.e., an expression having source language words arranged in a target language pattern. Thus, the syntax and sentence structure of the target language has been substituted for the syntax and sentence structure of the source language so that the raw translation of the LCF will make sense in the target language. In this example, a raw translation of the LCF yields "He put book on desk," and the method disclosed in the second patent then refines that raw translation and produces "He put the book on the desk."

The English sentence: "She read the book quickly." follows the pattern: P+V+article+N+Adv. There are countless English sentence that follow this information pattern, such as: "He threw the ball slowly." Thus, in accordance with the teachings of this invention, this particular information pattern is stored in a Knowledge Base; it represents countless English sentences.

The present inventor has identified about 7,000 information pattern pairs in the Chinese and the English languages, respectively. Thus, instead of storing millions of English language sentences in the memory of the third generation machine, all that needs to be stored, where the target language is English, are about 7,000 information pattern pairs.

After the first generation of the novel machine has provided a raw translation, the present machine identifies the information pattern of the source language sentence, consults the Knowledge Base, and selects the target language information pattern that has been predetermined as corresponding to the source language information pattern. The source language words are then placed into the order of the target language information pattern to form an LCF which is used to generate the raw translation, and the work of the third generation machine (the present invention) is then finished. Final polishing based upon the application of grammar rules is then performed by the machine disclosed in the second patent to complete the translation process.

In this way, an infinite number of sentences can be translated, even though the knowledge base contains only a few thousand information patterns of the source and target languages.

It is thus understood that the primary object of the present invention is to provide translations that convert the syntax and sentence structures of a source language into the syntax and sentence structure of a target language.

A closely related object is to advance the art of sentence translation by disclosing the tool of information patterns, the creation of an information pattern knowledge base, and the generation of LCFs.

These and other important objects, features, and advantages of the invention will become apparent as this description proceeds.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

The novel method represents a group of numerous sentence patterns by an Information Pattern (IP). An IP is a generalized representation of a group of sentence patterns, and it is expressed in terms of an arrangement of parts of speech (POS) of a group of sentences. There are numerous IPs for Chinese sentences and each Chinese sentence has an LCF with respect to a target language.

The word "Ta" (meaning "the," "she," or "it") is used frequently in constructing Chinese sentences. Thus, "Ta" yields a number of IPs. A typical IP is: Ta+N+V+de+Adv ("de" is an untranslatable particle with no English equivalent).

The sentence "Ta Ying Yu jiang de hao" may be literally translated as "He English speaks de well." The Chinese IP for this sentence is: P+N+V+de+Adv. The corresponding English IP for English translation is: P+V+N+Adv, i.e., for every source language IP there is a target language IP.

The LCF for the Chinese sentence is found by putting the Chinese words in the order of the English IP. Thus, placing the Chinese words in the order of P+V+N+Adv, the LCF for the Chinese sentence is: "Ta jiang Ying Yu hao," ("Ta" being a pronoun, "jiang" being a verb, "Ying Yu" being a Noun, and "hao" being an adverb) and the raw English is therefore "He speak English well"; the method of the third patent then produces "He speaks English well."

Figure 1:
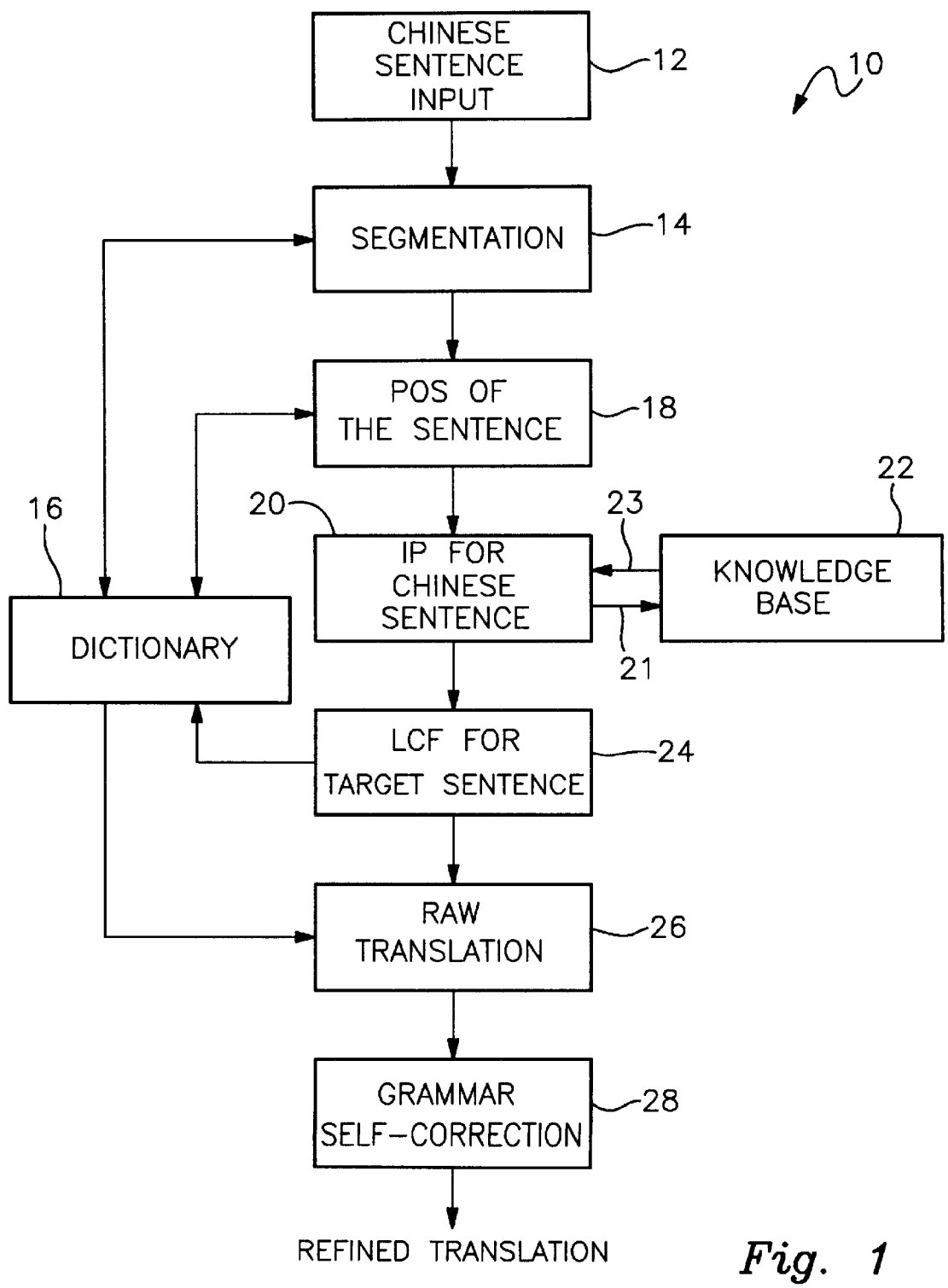
FIG. 1 is a flow chart including the first, second, and third generations of the novel translation method.

Referring now to FIG. 1, it will there be seen that an exemplary embodiment of the invention is denoted as a whole by the reference numeral 10.

A Chinese sentence, in the form of a string of Chinese characters, is input into the machine at function block 12. Using the method steps explained in the first patent, i.e., U.S. Pat. No. 5,224,040, which patent is fully incorporated hereinto by reference, the string of characters is divided into segments, at function block 14, where each segment represents a word; dictionary 16 is consulted as a part of the segmentation process. At this point, the source language sentence has been handled in accordance with the steps of the method set forth in said U.S. Pat. No. 5,224,040.

The steps of the present inventive method are then performed. More particularly, the parts of speech (POS) of the segmented sentence are identified at function block 18 by again making reference to dictionary 16, and the information pattern (IP) for the sentence (which is still in the source language) is identified at function block 20. Knowledge base 22 is then consulted, as indicated by arrow 21, and an attempt is made to match the IP of the source language with a predetermined corresponding IP in the target language. In view of the comprehensive nature of knowledge base 22, the attempt will be successful. As indicated by arrow 23, the IP in the target language that matches the IP in the source language, as predetermined, flows to function block 20a and then to function block 24. At function block 24, the LCF for the target sentence is provided by making reference to dictionary 16. At this point, if the source language is Chinese and the target language is English, the sentence will be in English-Chinese, i.e., the expression will be in Chinese words arranged in the correct English syntax and sentence structure. The LCF is then translated into a raw English sentence by addressing dictionary 16 at function block 26.

The final steps of the method are performed by the second generation of the machine, as set forth in the second patent, i.e., U.S. Pat. No. 5,384,702, which is fully incorporated hereinto by reference. Thus, the grammar rules and self-correction rules of the method disclosed in said second patent are performed at function block 28 to produce a polished, refined translation.

Figure 2:
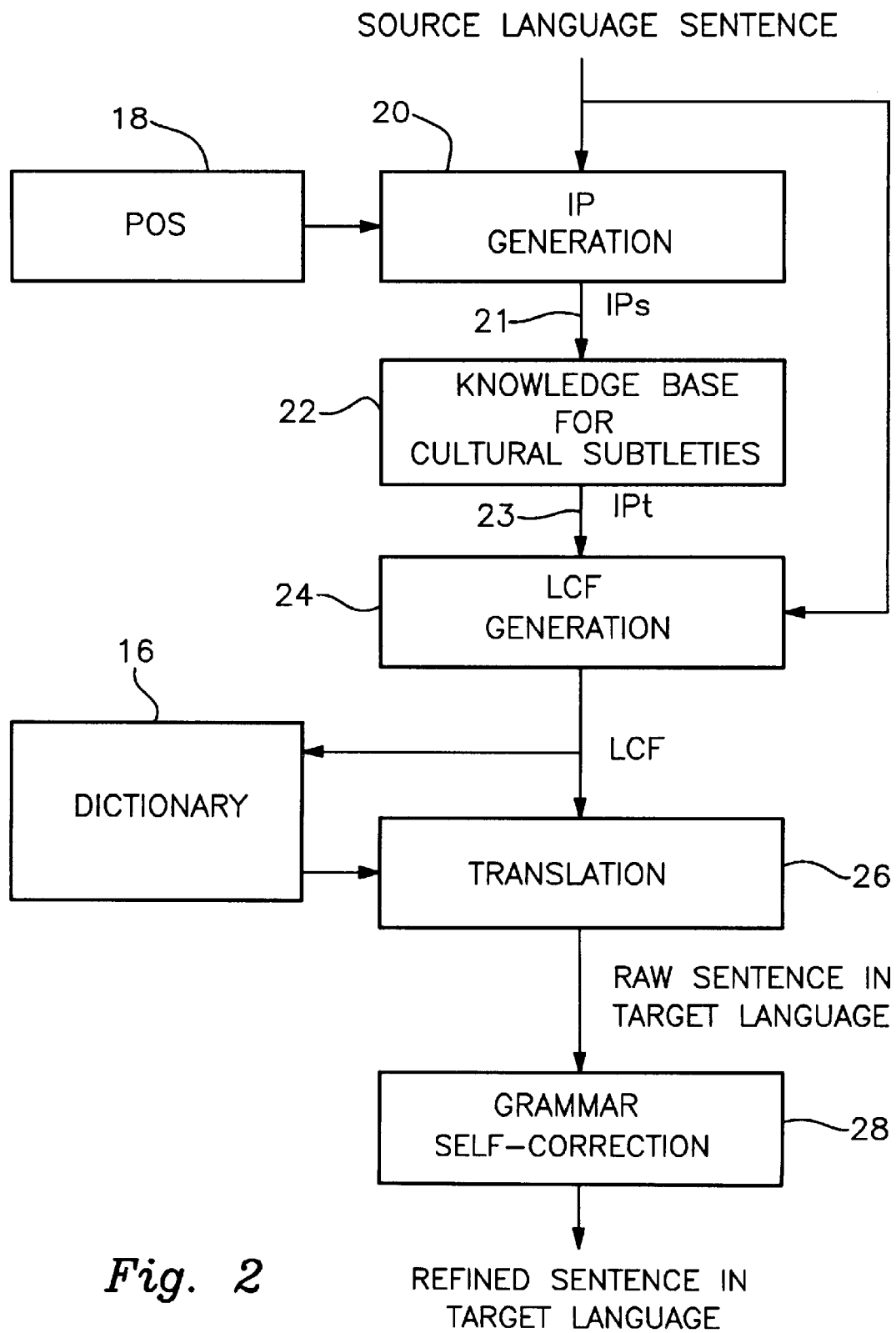
FIG. 2 is a flow chart including a more detailed description of the third generation thereof.

As disclosed in greater detail in FIG. 2, generation of an information pattern (IP) at function block 20 upon receipt of the identified parts of speech from function block 18 is a prerequisite to generation of the LCF for the sentence. The IP generated upon receipt of the POS in the source language will be a source language IP; this IP is fed to knowledge base 22 as at 21 and when the match is found, the corresponding IP of the target language is fed to LCF generator 24 as indicated by arrow 23. At this point, the cultural subtleties of the target language have been substituted for the cultural subtleties of the source language, thereby greatly easing the task of the final translation steps.

Dictionary 16 is consulted to provide a raw translation at function block 26, but it should be remembered that the words of the raw translation are now arranged in an order consistent with the information pattern of the target language that corresponds to the information pattern of the source language. Thus, the rules disclosed in the second patent are applied to such raw translation at function block 28 and a refined, polished sentence in the target language is produced.

The insight that the number of information patterns in any language is finite and manageable by a computer has resulted in a pioneering, breakthrough invention. Thus, the method of employing a computer to retrieve from a knowledge base a predetermined information pattern in a target language that represents a counterpart of an identified source language information pattern, followed by insertion of the source language words into the predetermined target language information pattern to generate an LCF which is then translated and polished is a breakthrough invention as well. In view of the pioneering nature of this invention, the claims that follow are entitled to broad interpretation, so as to protect the heart of this invention.

It will thus be seen that the objects set forth above, and those made apparent from the foregoing description, are efficiently attained and since certain changes may be made in the foregoing construction without departing from the scope of the invention, it is intended that all matters contained in the foregoing construction or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, what is claimed is:

1. A method for translating a sentence in a source language into a sentence in a target language, using a computer means, where the thought processes and sentence structures of the source language are converted into the thought processes and sentence structures of the target language, comprising the steps of:

inputting a source language sentence;

identifying parts of speech of said source language sentence and identifying the order within which said parts of speech occur in said source language;

identifying an information pattern in said source language that includes said parts of speech arranged in said order;

identifying a predetermined information pattern in said target language that corresponds to said identified information pattern in said source language;

providing a knowledge base that contains a plurality of information patterns of the source language;

providing in said knowledge base a plurality of information patterns of the target language;

associating each information pattern in the source language with a predetermined information pattern in the target language;

identifying the corresponding target language information pattern from the information pattern knowledge base and substituting the source language words into the predetermined target language information pattern; and generating a linguistic canonical form from the identified target language information pattern and translating the source language words in the linguistic canonical form to provide a raw translation of the source language sentence.

2. The method of claim 1, further comprising the step of refining said raw translation by applying thereto a set of self-correcting grammar rules.

* * * * *